(12) United States Patent
Shabtay

(10) Patent No.: US 9,291,701 B2
(45) Date of Patent: Mar. 22, 2016

(54) DEVICE, SYSTEM AND METHOD OF ESTIMATING A RELATIVE LOCATION OF A MOBILE DEVICE

(75) Inventor: Ophir Shabtay, Kfar Saba (IL)

(73) Assignee: INTEL CORPORATION, Santa Clara, CA (US)

(*) Notice: Subject to any disclaimer, the term of this patent is extended or adjusted under 35 U.S.C. 154(b) by 324 days.

(21) Appl. No.: 13/976,155

(22) PCT Filed: Dec. 27, 2011

(86) PCT No.: PCT/US2011/060707
§ 371 (c)(1),
(2), (4) Date: Jun. 26, 2013

(87) PCT Pub. No.: WO2013/100886
PCT Pub. Date: Jul. 4, 2013

(65) Prior Publication Data
US 2014/0206382 A1  Jul. 24, 2014

(51) Int. Cl.
G01S 5/02 (2010.01)
(52) U.S. Cl.
CPC .............. *G01S 5/0289* (2013.01); *G01S 5/0284* (2013.01)
(58) Field of Classification Search
CPC ..... G01S 5/0284; G01S 5/0289; G01S 19/42; G01S 19/51
USPC .......... 455/404.1, 404.2, 456.1–457
See application file for complete search history.

(56) References Cited

U.S. PATENT DOCUMENTS

| 7,397,782 | B2 | 7/2008 | Posamentier |
| 7,764,231 | B1 | 7/2010 | Karr et al. |
| 2004/0236850 | A1* | 11/2004 | Krumm et al. ............... 709/224 |
| 2005/0113107 | A1* | 5/2005 | Meunier .................... 455/456.1 |
| 2005/0134456 | A1* | 6/2005 | Niu et al. .................. 340/539.23 |
| 2006/0046709 | A1* | 3/2006 | Krumm et al. .............. 455/422.1 |
| 2011/0187599 | A1 | 8/2011 | Graybeal et al. |

FOREIGN PATENT DOCUMENTS

WO  2004008171 A1  1/2004

OTHER PUBLICATIONS

International Preliminary Report on Patentability and Written Opinion for PCT Patent Application No. PCT/US2011/060707, mailed on Jul. 10, 2014, 6 pages.

IEEE Std 802.11™ -2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

International Search Report and Written Opinion for PCT/US2011/060707, mailed on May 1, 2012; 10 pages.

\* cited by examiner

*Primary Examiner* — Vladimir Magloire
*Assistant Examiner* — Erica Navar
(74) *Attorney, Agent, or Firm* — Shichrur & Co.

(57) ABSTRACT

Some demonstrative embodiments include devices, systems and/or methods of determining a relative-location of a mobile device. For example, a proximity estimator may receive input information of at least first and second sets of one or more wireless communication devices corresponding to first and second mobile devices, respectively, and may determine a relative location of the first mobile device with respect to the second mobile device based on a relationship between the information of the first and second sets.

20 Claims, 4 Drawing Sheets

DEVICE, SYSTEM AND METHOD OF ESTIMATING A RELATIVE LOCATION OF A MOBILE DEVICE

CROSS REFERENCE

This application is a National Phase Application of PCT International Application No. PCT/US2011/060707, International Filing Date Dec. 27, 2011, the entire disclosure of which is incorporated herein by reference.

BACKGROUND

Wireless communication devices and/or systems may utilize methods of determining a location of a mobile device and/or proximity between two or more mobile devices. For example, a social-application may utilize proximity between two or more mobile devices, e.g., to provide proximity-based information and/or communications to the users of the devices.

The location of the mobile device may be determined based on a Global-Positioning-System (GPS) signal. However, in some situations, e.g., when the mobile device is at an indoor location, the GPS signal may not be available and/or accurate.

In one method, a last location of the device according to the GPS signal may be used. However, this method may provide a relatively low level of accuracy, e.g., an accuracy of about 300 to 1000 meters.

In another method, a fingerprint database may be prepared based on a predetermined "fingerprint", which is measured throughout many locations within a predefined premises. The fingerprint at each location may include a list of one or more signal strengths, e.g., one or more Received Signal Strength Indicators (RSSI), as measured at the location at the time of measurement, associated with one or more respective Access Points (APs), e.g., represented by respective a Transmit (Tx) Media-Access-Control (MAC) address of the AP. However, this method may not be efficiently scalable, and may require the process of manually measuring the fingerprints at many locations and the overhead of storing and/or managing the fingerprint database. Additionally, the accuracy of this method may be affected by real-time changes in the configuration and/or location of one or more of the APs. For example, if after the fingerprint database is established, one or more APs is temporarily and/or permanently removed, relocated and/or modifies the transmission power and, accordingly, the actual fingerprint, e.g., as measured by a mobile device in real-time, at one or more locations, may be different from the pre-stored fingerprint of the location in the fingerprint database. As a result, an erroneous location of the mobile device may be determined.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
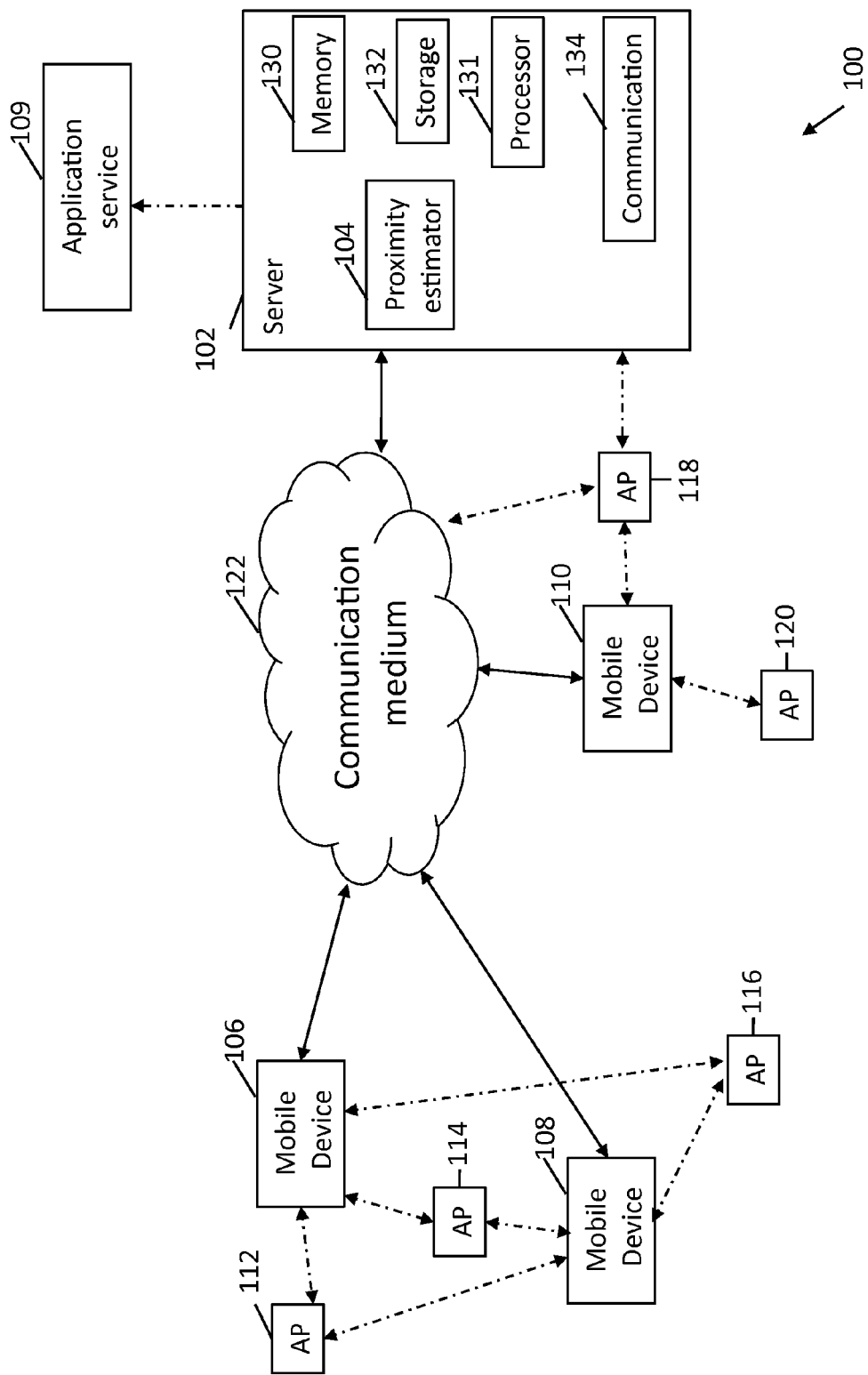
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example. "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a wired or wireless network, a Wireless Positioning System (WPS), a wireless area network, a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version* 1.0, *April* 2010, *Final specification*) and/or future versions and/or derivatives thereof, devices and/or networks operating in accordance with existing IEEE 802.11 standards (*IEEE 802.11-2007, IEEE Standard for Information Technology—Telecommunications and information exchange between systems—Local and metropolitan area networks—Specific requirements, Part* 11*: Wireless LAN Medium Access Control (MAC) and Physical Layer (PHY) Specifications*) and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems*) and/or future versions and/or derivatives thereof, devices and/or networks operating in accordance with existing Bluetooth standards, and/or future versions and/or derivatives thereof, units and/or devices which are part of the above networks, a Multiple Input Multiple Output (MIMO) transceiver or device, a Single Input Multiple Output (SIMO) transceiver or device, a Multiple Input Single Output (MISO)

transceiver or device, a device having one or more internal antennas and/or external antennas, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The phrase "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The phrase "mobile device" as used herein includes any suitable portable, movable, transportable, non-stationary and/or non-fixed wireless device. The mobile device may include, for example, a mobile computer, a laptop computer, a notebook computer, a tablet computer, a handheld computer, a handheld device, a Personal Digital Assistant (PDA) device, a handheld PDA device, a hybrid device, a consumer device, a wireless communication device, a cellular device, a cellular telephone, a mobile internet device (MID), a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a wireless handheld device (e.g., BlackBerry, Palm Treo), a Wireless Application Protocol (WAP) device, and the like.

Reference is now made to FIG. 1, which schematically illustrates a block diagram of a system 100 in accordance with some demonstrative embodiments.

In some demonstrative embodiments, system 100 may include an indoor-based system located within any suitable indoor premises and/or location, e.g., a building, a shop, an office, a shopping center, a mall, and the like. In other embodiments, system 100 may include an outdoor system located outdoors and/or in a combination of one or more indoor locations, e.g., one or more buildings, and/or one or more outdoor locations. In one example, system 100 may be deployed within a shopping center or a campus. In another example, system 100 may be deployed on a large-scale basis, e.g., nationwide or even worldwide.

As shown in FIG. 1, in some demonstrative embodiments, system 100 may include a server 102 capable of communicating with one or more mobile devices, e.g., mobile devices 106, 108 and/or 110, via at least one wireless communication medium 122. Wireless communication medium 12 may include, for example, one or more suitable wireless communication links, for example, a radio channel, an IR channel, a RF channel, a Wireless Fidelity (WiFi) channel, a Bluetooth channel, a cellular channel, and the like.

In some demonstrative embodiments, mobile devices 106, 108 and/or 110 may include, for example, a mobile computer, a laptop computer, a notebook computer, a tablet computer, a handheld computer, a handheld device, a PDA device, a handheld PDA device, a hybrid device (e.g., combining cellular phone functionalities with PDA device functionalities), a consumer device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a MID, an "Origami" device or computing device, a device that supports Dynamically Composable Computing (DCC), a context-aware device, a video device, an audio device, an A/V device, a camera, a video camcorder, a dedicated Wireless tag, which is attachable to a device, equipment, an object or a human, a car, a truck, a bus, a tram, a train, an airplane, a broadcast radio receiver, a Personal Media Player (PMP), a gaming device, a media player, a Smartphone, a television, a music player, an Ultrabook™, or the like.

In some demonstrative embodiments, server 102 may include at least one communication module 134 to communicate, directly or indirectly, with mobile devices 106, 108 and/or 110. In one embodiment, communication module 134 may include a wireless communication to perform wireless communication, for example, directly with mobile devices 106, 108 and/or 110. e.g., in accordance with one or more wireless communication schemes or protocols, e.g., WiFI, WiGig, Bluetooth, cellular, and the like. In another embodiment, communication module 134 may communicate with mobile devices 106, 108 and/or 110 indirectly, e.g., via one or more other communication modules and/or devices and/or communication mediums, e.g., the Internet. For example, communication module 134 may communicate with a mobile device, e.g., mobile device 110, via at least one other device, e.g., via AP 118. For example, communication module 134 may be connected to AP 118 via a wired or wireless medium, and mobile device 110 may be associated with AP 110 via a wireless link. According to this example, AP 118 may interface between server 102 and mobile device 110.

In some demonstrative embodiments, communication module 134 include, for example, one or more wired and/or wireless transmitters, receivers and/or transceivers able to send and/or receive wired and/or wireless communication signals, RF signals, frames, blocks, transmission streams, packets, messages, data items, and/or data. For example, communication module 134 may include or may be implemented as part of a wireless Network Interface Card (NIC), a wired communication interface, and the like.

In some demonstrative embodiments, communication module 134 may include, or may be associated with, one or more antennas, for example, any type of antennas suitable for transmitting and/or receiving wireless communication signals, blocks, frames, transmission streams, packets, messages and/or data. For example, communication module 134 may include, or may be associated with, any suitable configuration, structure and/or arrangement of one or more antenna elements, components, units, assemblies and/or arrays.

Server 102 may also include, for example, one or more of a processor 131, a memory unit 130, and a storage unit 132. Server 102 may optionally include other suitable hardware components and/or software components. In some demonstrative embodiments, some or all of the components of one or more of server 102 may be enclosed in a common housing or packaging, and may be interconnected or operably associated using one or more wired or wireless links. In other embodiments, components of one or more of server 102 may be distributed among multiple or separate devices.

Processor 131 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 131 executes instructions, for example, of an Operating System (OS) of server 102 and/or of one or more suitable applications.

Memory unit 130 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 132 includes, for example, a hard disk drive, a floppy disk drive, a Compact Disk (CD) drive, a CD-ROM drive, a DVD drive, or other suitable removable or non-removable storage units. Memory unit 130 and/or storage unit 132, for example, may store data processed by server 102.

In some demonstrative embodiments, server 102 may include a proximity estimator 104 configured to estimate a proximity between two or more of mobile devices 106, 108 and 110, e.g., as described in detail below. Proximity estimator 104 may be implemented by any suitable hardware and/or software components. In one example, proximity estimator 104 may be implemented as an application resulting from a processor, e.g., processor 131, executing application instructions stored on a memory and/or storage, e.g., memory 130 and/or storage 132.

In some demonstrative embodiments, proximity estimator 104 may be configured to determine a relative location of at least one first mobile device of devices 106, 108 and 110 with respect to at least one second mobile device of mobile devices 106, 108 and 110, e.g., as described in detail below.

In some demonstrative embodiments, proximity estimator 104 may determine the relative location of the first mobile device with respect to the second device in real-time. For example, proximity estimator 104 may determine the relative location of the first mobile device with respect to the second device based on information received from the first and second mobile devices, e.g., in real-time.

In some demonstrative embodiments, proximity estimator 104 may determine the relative location of the first mobile device with respect to the second device, for example, independent of and/or without using and/or determining an absolute location and/or coordinates of the first and/or second mobile devices, e.g., as described in detail below.

In some demonstrative embodiments, proximity estimator 104 may determine the relative location of the first mobile device with respect to the second device, for example, based directly on the information received from the first and second mobile devices, e.g., as described in detail below. Accordingly, proximity estimator 104 may determine the relative location of the first mobile device with respect to the second device, for example, independent of and/or without using any predefined, predetermined, pre-stored, a-priori, and/or pre-measured information, e.g., any predefined, predetermined, pre-stored, a-priori, and/or pre-measured location-based information, relating to one or more wireless communication devices, e.g., APs, for example, a fingerprint database, a tri-lateration database and the like. Therefore, proximity estimator 104 may be capable of determining the relative location of the first mobile device with respect to the second device, in an efficiently scalable manner, which may account for real-time changes in the status and/or location of the one or more APs.

In some demonstrative embodiments, proximity estimator 104 may receive input information of at least first and second respective sets of one or more wireless communication devices corresponding to the first and second mobile devices, respectively. The first set of wireless communication devices may include, for example, one or more wireless communication devices in detection range of the first mobile device and/or the second set of wireless communication devices may include, for example, one or more wireless communication devices in detection range of the second mobile device.

The phrase "detection range" as used herein with respect to first and second entities may relate to at least one of the first and second entities being able to detect one or more wireless signals transmitted by another one of the first and second entities. For example, the first entity may be in detection range of the second entity if the first entity may detect signals transmitted by the second entity, and the second entity may detect signals transmitted by the first entity; if the first entity may detect signals transmitted by the second entity, while the second entity may not detect signals transmitted by the first entity; or if the first entity may not detect signals transmitted by the second entity, while the second entity may detect signals transmitted by the first entity.

In some demonstrative embodiments, proximity estimator 104 may receive the input information from the first and second mobile devices. For example, proximity estimator 104 may receive from the first and second mobile devices at least first and second respective inputs including information of at least first and second sets of one or more APs detected by the first and second mobile devices, respectively.

Some demonstrative embodiments are described herein with respect to a server, e.g., server 102, receiving input information corresponding to the first and second mobile devices from the first and second mobile devices. However, in other embodiments, the server may receive the input information from one or more other sources, e.g., from the one or more wireless communication devices in communication with the first and second mobile devices. For example, proximity estimator 104 may receive from a first set of one or more APs, which detect the first mobile device, information of a signal strength of the first mobile device, as measured by the one or more APs of the first set; and/or proximity estimator 104 may receive from a second set of one or more APs, which detect the second mobile device, information of a signal strength of the second mobile device, as measured by the one or more APs of the second set.

Some demonstrative embodiments are described herein with reference to a server, e.g., server 102, receiving from a mobile device an input including information of a set of one or more APs detected by the mobile device. However, in other embodiments, the server may receive from the mobile device an input including information of one or more other wireless communication devices detected by the mobile device, for example, a control point, e.g., a Personal-Basic-Service-Set (PBSS) Control Point (PCP), a Piconet Coordinator (PNC), and the like.

For example, as shown in FIG. 1, mobile device 106 may detect a first set of APs, e.g., including APs 112 and 114; mobile device 108 may detect a second set of APs, e.g., including APs 112, 114 and 116; and/or mobile device 110 may detect a third set of APs, e.g., including APs 118 and 120.

In some demonstrative embodiments, the input corresponding to the mobile device may include, for example, one or more values, as measured by the mobile device, with respect to wireless signals received from the set of wireless communication devices, e.g., as described below. In another embodiment, the input corresponding to the mobile device may include, for example, one or more values, as measured by one or more wireless communication devices, e.g., APs with respect to wireless signals received from the mobile device.

In some demonstrative embodiments, the input corresponding to the mobile device may include, for example, one or more values, as measured by the mobile device and/or the set of wireless communication device, which depend on a relative location of the mobile device with respect to the set of wireless communication devices.

In some demonstrative embodiments, the input corresponding to the mobile device may include, for example, one or more Received Signal Strength Indicators (RSSIs) corresponding to signals received by the mobile device from the one or more wireless communication devices.

In some demonstrative embodiments, the input corresponding to the mobile device may include, for example, a scan list of the mobile device. The scan list may include, for example, with respect to each detected wireless communication device, an identifier of the detected wireless communication device, e.g., in the form of a Media-Access-Control (MAC) address or an AP identifier (APID), and a measured value indicating a distance from the detected wireless communication device, e.g., in the form of a RSSI value.

The scan list may include any other list and/or information, which may be determined based on any beacon, detection signal, such as, but not limited to, a Time of Flight (TOF) measurement, an angle of arrival measurement, a channel estimation measurement, a precoding and/or beam forming feedback, and/or any other signal received from and/or advertised by one or more wireless communication devices, e.g., a WiFi signal, a Cellular signal, a digital Television (TV) signal, a Bluetooth signal, e.g., a Bluetooth Low Energy (BLE) signal, and the like. The proximity estimation corresponding to the first and second mobile devices may not be sensitive to a transmission scheme, e.g., Frequency Division Duplexing (FDD), Time Division Duplexing (TDD) or hopping transmission schemes, for example, as long as the first and second mobile devices determine the scan list with respect to the same band and the same transmitter.

For example, server 102 may receive from mobile device 106 a first input including a first scan list. The first scan list may include a MAC address of AP 112 and a RSSI of AP 112, as measured by mobile device 106; and a MAC address of AP 114 and a RSSI of AP 114, as measured by mobile device 106.

Server 102 may receive from mobile device 108, for example, a second input including a second scan list. The second scan list may include a MAC address of AP 112 and a RSSI of AP 112, as measured by mobile device 108; a MAC address of AP 114 and a RSSI of AP 114, as measured by mobile device 108; and a MAC address of AP 116 and a RSSI of AP 116, as measured by mobile device 108.

Server 102 may receive from mobile device 110, for example, a third input including a third scan list. The third scan list may include a MAC address of AP 118 and a RSSI of AP 118, as measured by mobile device 110; and a MAC address of AP 120 and a RSSI of AP 120, as measured by mobile device 110.

Some embodiments are described herein with respect to a server, e.g., server 102, receiving from a mobile device an input including a scan list including information of at least one detected AP, e.g., in the form of a MAC address of the AP and a RSSI measured with respect to the AP. However, in other embodiments, the server may receive from the mobile device any other input relating to a detected wireless communication device and indicative of a relative location of the mobile device with respect to the detected wireless communication device, e.g., a value indicative of a TOF of a signal from the detected wireless communication device.

In some demonstrative embodiments, server 102 may receive the inputs from mobile devices 106, 108 and/or 108 substantially in real time. For example, mobile devices 106, 108 and/or 108 may transmit the first, second and third scan lists, respectively, in real time and/or according to any suitable feedback scheme, for example, at a predefined rate, e.g., every one second, every one minute, and the like.

In one example, the feedback scheme of a mobile device may include a dynamic feedback scheme, which may be based, for example, on a movement of the mobile device. For example, the feedback rate may be correlated with a rate of movement of the mobile device. For example, mobile device 106 may transmit the input to server 102 at a first rate, e.g., once per minute, when mobile device 106 is moving at a velocity lesser than a predefined velocity or not moving at all; and mobile device 106 may transmit the input to server 102 at a second rate, greater than the first rate, e.g., once per second, when mobile device 106 is moving at a velocity grater than the predefined velocity. The velocity of the mobile device may be estimated, for example, using on one or more motion sensors, such as, an accelerometer, a gyroscope, a GPS, and the like, and/or based on one or more measurements with respect to the radio signal, e.g., a Doppler estimation, a dynamic of the scan list received, and the like.

In some demonstrative embodiments, proximity estimator 104 may determine a relative location of a first mobile device of mobile devices 106, 108 and/or 110 with respect to a second mobile device of mobile devices 106, 108 and 110 based on the first and second inputs received from the first and second mobile devices. Proximity estimator 104 may determine the relative location between the first and second mobile devices, for example, without utilizing and/or requiring any information of the absolute location of the APs of system 100, e.g., as described herein.

In some demonstrative embodiments, proximity estimator 104 may determine the proximity between the first and second mobile devices based on a single scan list from each of the first and second mobile devices. However, in other embodiments, proximity estimator 104 may utilize a plurality of, e.g., consecutive, inputs from a mobile device, for example, by filtering the plurality of inputs through a linear filter, e.g. a low pass filter or a weighted average, or a non-linear filter, e.g., a median.

In some demonstrative embodiments, proximity estimator 104 may determine the relative location of the first mobile device with respect to the second mobile device based on a relationship between the measured values corresponding to the first mobile device and the measured values corresponding to the second mobile device. For example, proximity estimator 104 may determine a predefined proximity parameter ("metric") based on first and second scan lists received from the first and second mobile devices, respectively, e.g., as described below.

In some demonstrative embodiments, proximity estimator 104 may determine the relative location between the first and second mobile devices based at least on a similarity between the identities of APs corresponding to the first mobile device and the identities of the one or more APs corresponding to the second mobile device. In one example, the proximity parameter may be defined based on a number of APs ("the common APs") included in both the first and second scan lists, a ratio between a the number of the common APs and a number of APs (the non-common APs) included in one of the first and second scan lists and not included in another of the first and second scan lists, and/or any other similarity between the identities of the APs included in the first and second scan lists.

In some demonstrative embodiments, proximity estimator 104 may determine the relative location between the first and second mobile devices based on distance-based information, for example, the signal strength information, e.g., the RSSI, corresponding to the one or more APs detected by the first mobile device and the one or more APs detected by the second mobile device. In one example, the proximity metric may be based on the RSSIs detected by the first and second mobile devices with respect to each one of the common APs. For example, a relatively high correlation, e.g., similarity, between the RSSIs detected by the first and second mobile devices with respect to the common APs may indicate a greater proximity between the first and second mobile devices. For example, the proximity parameter may indicate a first proximity level between the first and second mobile devices, e.g., if the RSSIs detected by the first and second mobile devices with respect to each one of the common APs have a first level of similarity. The proximity metric may indicate a second proximity level between the first and second mobile devices, for example, a proximity level greater that the first proximity level, e.g., if the RSSIs detected by the first and second mobile devices with respect to each one of the common APs have a second level of similarity, e.g., greater than the first level of similarity.

In some demonstrative embodiments, proximity estimator 104 may utilize a "phased" estimation method, which may be capable of determining the relative location of the first and second mobile devices according to one or more accuracy levels.

For example, proximity estimator 104 may determine the relative location of the mobile devices at a first, broad, proximity level, e.g., based on a similarity between the identities of the APs detected by the mobile devices, e.g., using the APIDs or MAC address. Proximity estimator 104 may determine the relative location of the mobile devices at a second, greater, proximity level, e.g., based on a relationship between the scan-lists received from the mobile devices. Proximity estimator 104 may determine the relative location of the mobile devices at a third, finer, proximity level, e.g., based on the history information, motion information and the like. Additionally, or alternatively, server 102 may cause the mobile devices to initiate a peer to peer link.

In some demonstrative embodiments, proximity estimator 104 may determine proximity between a plurality of mobile devices by identifying one or more pairs of mobile devices having at least a predefined number, denoted G, of common APs, e.g., included in the scan lists reported by the mobile devices.

In some demonstrative embodiments, proximity estimator 104 may determine a median value, denoted M(i,j,n), corresponding to an n-th Received Signal Strength (RSS) measurement by an i-th device of a pair of devices, e.g., i={0,1}, with respect to a j-th common AP, wherein J=0 . . . k−1, and wherein k denotes the number of common APs corresponding to the i-th device. For example, proximity estimator 104 may determine the median value M(i,j,n) based on a predefined number, denoted K, of RSS measurements, e.g., K=5 or any other suitable number, as follows:

$$M(i,j,n)=\text{Median}\{RSS(i,j,n-k+1), RSS(i,j,n-k+2), \ldots, RSS(i,j,n)\}) \quad (1)$$

In some demonstrative embodiments, proximity estimator 104 may determine a proximity metric, denoted Location_Proximity_Estimate, corresponding to the pair of devices based on the median values corresponding to the pair of devices.

For example, proximity estimator 104 may identify a predefined number, denoted L, for example, L<=5, e.g., L=3, of strongest combinations of median values, e.g., the combination (M(0, j', n)+M(1, j', n)) corresponding to a j'-th common AP, j'=1 . . . L, or any other combination.

In one example, proximity estimator 104 may determine the proximity metric Location_Proximity_Estimate, e.g., a follows:

$$\text{Location\_Proximity\_Estimate}=a^*[\text{Max}_{j'}\{\text{abs}(\text{Db\_to\_}m(M(0,j',n))-\text{Db\_to\_}m(M(1,j',n)))\}-b] \quad (2)$$

wherein Db_to_m denotes a conversion function, e.g., using a parametric propagation formula or a lookup table, between Decibel (Db) values to metric values; and wherein a and b denote empiric constants. The conversion function may be replaced with another conversion function, e.g., based on the type of measurement performed by the device, for example, for Time of Flight, the conversion function may be replaced by a Time based range estimation.

In another example, proximity estimator 104 may determine the proximity metric Location_Proximity_Estimate, e.g., as follows:

$$\text{Location\_Proximity\_Estimate}=[\text{SUM}_{j'}(\text{abs}(\text{Db\_to\_}m(M(0,j',n))-\text{Db\_to\_}m(M(1j',n))))-b]^*a/L \quad (3)$$

Figure 2:
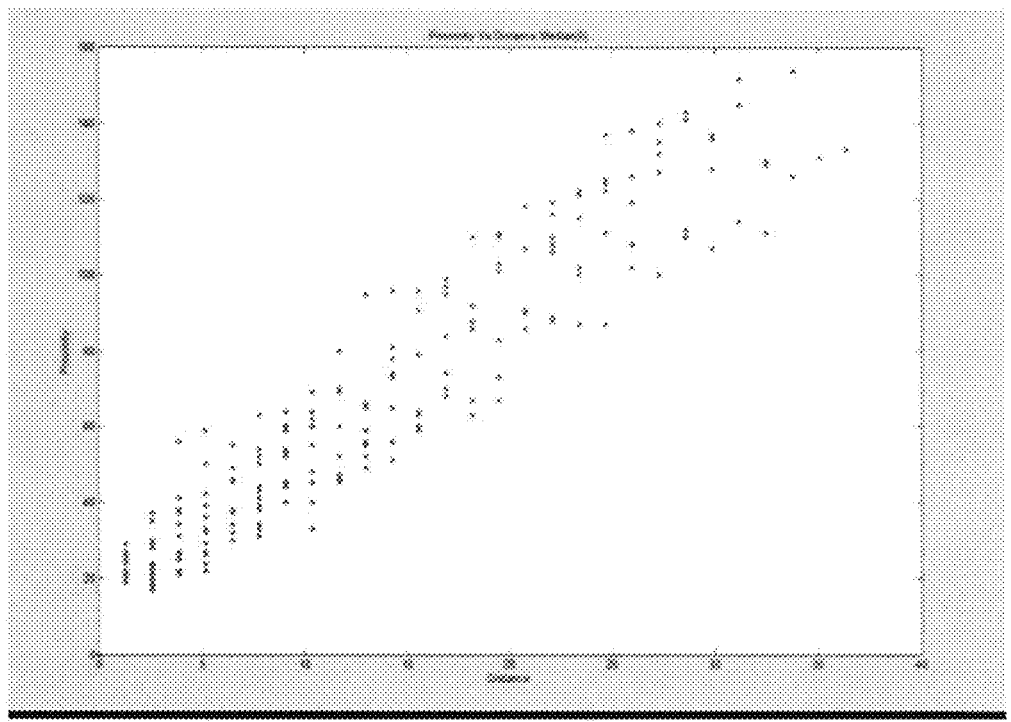
FIG. 2 is a schematic illustration of a graph depicting a proximity parameter versus relative distance, in accordance with some demonstrative embodiments.

Reference is made to FIG. 2, which schematically illustrates a graph depicting a proximity parameter, e.g., the proximity metric Location_Proximity_Estimate, versus relative distance between first and second mobile devices, in accordance with some demonstrative embodiments.

In some demonstrative embodiments, the proximity parameter of FIG. 2 may be determined, for example, in accordance with Equation 3, e.g., with b=20 and a/L=⅓. For example, a server, e.g., server 102 (FIG. 1), or a proximity estimator, e.g., proximity estimator 104 (FIG. 1), may determine a relative distance between first and second mobile devices, e.g., between a first mobile device of devices 106, 108 and 110 (FIG. 1) and a second mobile device of devices 106, 108 and 110 (FIG. 1), in accordance with the proximity parameter of FIG. 2.

Referring back to FIG. 1, in some demonstrative embodiments, server 102 may generate a proximity indication corresponding to the first and second mobile devices, if the determined relative location satisfies a proximity criterion, for example, if the relative location is less than a predefined distance, e.g., 25 meters.

In one example, server 102 may transmit the proximity indication, e.g., in the form of a proximity alert, to an application service 109. Application service 109 may include, for example, a consumer application, e.g., a location based advertisement service, a social application, a meeting application, and the like. For example, application service 109 may send information, e.g., an alert, an advertisement, and the like, to the first and/or second mobile devices, e.g., based on the proximity alert from server 102.

In another example, server 102 may transmit the proximity indication, e.g., in the form of a proximity alert, directly to the first and/or second mobile devices and/or to a client-based service and/or application associated with the first and/or second mobile devices.

In some demonstrative embodiments, proximity estimator 104 may estimate a relative location of a mobile device of devices 106, 108 and 110 based on a relationship between the input from the mobile device and at least one predefined stationary fingerprint corresponding to at least one respective location. For example, server 102 may store and/or receive one or more stationary fingerprints corresponding to one or more respective predefined locations, for example, a floor entrance, a shops, a room, a resource location, e.g., a location of a printer a screen, and the like. A stationary fingerprint at a location may include a measured RSSI from one or more APs as measured at the location at the time of measurement. Proximity estimator 104 may estimate a relative location of a mobile device of devices 106, 108 and 110 with respect to the one or more predefined locations based on a relationship between the input from the mobile device, e.g., the scan list of the mobile device, and the one or more fingerprints.

In some demonstrative embodiments, proximity estimator 104 may utilize the one or more stationary fingerprints to determine the relative location between first and second mobile devices of devices 106, 108, 110. For example, proximity estimator 104 may determine the relative location between the first and second mobile devices based on scan lists from the first and second mobile devices, and based on the one or more stationary fingerprints. In one example, a similar relationship between a stationary fingerprint and each of the scan lists of the first and second mobile devices may indicate a proximity between the first and second mobile devices.

In some demonstrative embodiments, proximity estimator 104 may utilize additional information to determine the relative location between the first and second mobile devices.

For example, proximity estimator 104 may utilize historic information, e.g., including previous locations of the mobile devices, previous interactions between the mobile devices, previous scan lists received from the mobile devices, and the like; motion information, e.g., including information related to a velocity of the mobile devices, a directionality of motion of the mobile devices, and the like.

In one example, proximity estimator may utilize altitude-related information, e.g., barometer and/or altimeter information, from mobile devices 106, 108 and/or 110, to differentiate between floors within a building.

In another example, mobile devices 106, 108 and/or 110 may include one or more motion detectors, e.g., Micro Electro Mechanical System (MEMS) sensors, to estimate and/or detect motion of mobile devices 106, 108 and/or 110. A degree of interaction between server 102 and mobile devices 106, 108 and/or 110 may be controlled based, for example, on the detected motion of mobile devices 106, 108 and/or 110. For example, mobile devices 106, 108 and/or 110 may periodically transmit the scan lists to server 102 at a rate, which may be based on the motion of mobile devices 106, 108 and/or 110, e.g., as described above.

In some demonstrative embodiments, the functionality of proximity estimator 104 may be balanced and/or distributed between server 102 and one or more of mobile devices 106, 108 and 110, for example, such that one or more of the operations performed by proximity estimator 104, e.g., both in the proximity domain and application domain, may be distributed to one or more of mobile devices 106, 108 and 110.

In some demonstrative embodiments, proximity estimator 104 may determine a crossing event between the first and second devices, for example, based on a predefined zero-crossing parameter. For example, the sign of the expression Db_to_m(M(0, j', n))−Db_to_m(M(1, j', n) may change for one or more of the common APs, for example, when the pair of mobile devices, e.g., devices 106 and 108, are relatively close to one another, or having crossing paths with respect to the detected APs., e.g., since the RSSI is correlated with the physical range and/or due to dynamic and/or noisy characteristics of the RSSI measurements in a multi-path environment, e.g., indoors.

In some demonstrative embodiments, proximity estimator 104 may be capable of detecting the zero-crossing between the pair of mobile devices, for example, according to the following algorithm:

```
While(1){
for(j' in the subset L){
S(j', n)=sign(Db_to_m(M(0,j',n))−Db_to_m(M(1,j',n)));
If (−Q<=1/w*(S(j', n−w+1)+S(j', n−w+2)+...+S(j', n))<=Q) then
Zero_Crossing_Event(j', n)=true;
}};
``` wherein Q denotes a configurable parameter, e.g., Q=0.6.

In some demonstrative embodiments, server 102 and/or proximity estimator 104 may be implemented as part of a hybrid system, e.g., in combination with multiple sources, for example, inertial navigation, Global Navigation Satellite System (GNSS), cellular, WiFi, Bluetooth, Near Field Communication (NFC), and the like.

Figure 3:
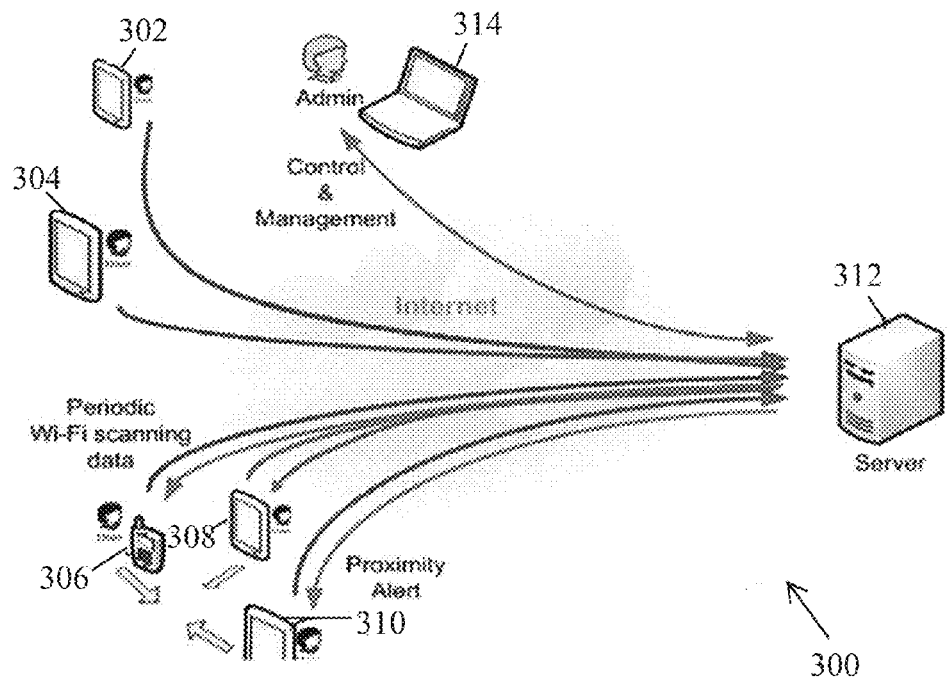
FIG. 3 is a schematic block diagram illustration of a proximity alerting system, in accordance with some demonstrative embodiments.

Reference is made to FIG. 3, which schematically illustrates a proximity alert system 300, in accordance with some demonstrative embodiments. In some demonstrative embodiments, system 100 (FIG. 1) may perform the functionality of proximity alert system 300.

In some demonstrative embodiments, proximity alert system 300 may be utilized, for example, for providing proximity alerts to a social application.

For example, a plurality of users of mobile devices 302, 304, 306, 308 and 310 may periodically transfer to a server, e.g., via the Internet, scan lists detected by the mobile devices, e.g., as described above.

Server 312 may be configured to determine relative locations between mobile devices 302, 304, 306, 308 and 310 based on the scan lists, e.g., as described above.

Server 312 may transmit the proximity indication, e.g., in the form of a proximity alert, to one or more of mobile devices 302, 304, 306, 308 and 310. For example, server 312 may determine that the relative locations between mobile devices 306, 308 and 310 meet a predefined proximity-based criterion, and may transmit proximity alerts to mobile devices 306, 308 and 310, e.g., as described above.

Server 312 may be controlled and/or managed by at least one administrator 314, e.g., to control one or more parameters corresponding to the determining of the relative locations, e.g., proximity algorithms, proximity parameters, and the like; one or more application parameters, one or more administration parameters, and the like.

Figure 4:
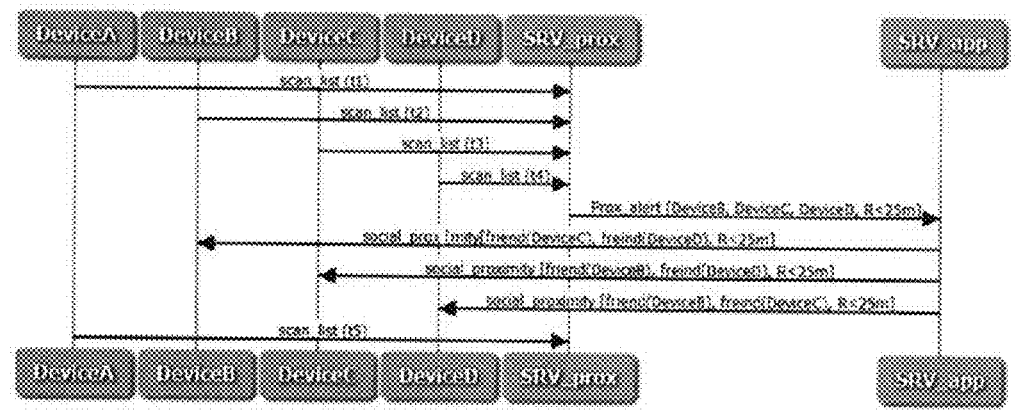
FIG. 4 is a schematic illustration of a data flow between elements of a proximity alerting system, in accordance with some demonstrative embodiments.

Reference is made to FIG. 4, which illustrates data flow between of a proximity alerting system, in accordance with some demonstrative embodiments. In some demonstrative embodiments, one or more operations of FIG. 4 may be performed between one or more elements of system 100 (FIG. 1), e.g., mobile devices 106, 108, 110 and/or server 102 (FIG. 1).

As shown in FIG. 4, a plurality of devices, denoted "Device A", "Device B", "Device C", and "Device D", may transmit a respective plurality of scan lists to a proximity server, denoted SRV_prox.

As shown in FIG. 4, the proximity server may detect proximity between two or more of the devices based on a predefined proximity criterion. For example, the proximity server may detect, based on the scanning lists, that devices B, C and D, are located within less than 25 meters from one another.

As shown in FIG. 4, the proximity server may provide one or more proximity alerts to an application server, denoted SRV_app. For example, the proximity server may transmit to the application server proximity alerts indicating that devices B, C and D are proximal to one another.

As shown in FIG. 4, the application server may transmit information to the mobile devices based on the proximity alerts. For example, the application server may include a social application server, which may associate the users of devices B, C and D, e.g., as being "friends. Accordingly, the application server may transmit to device B an indication that the users of device C and D are within a radius of 25 meters from the user of device B; the application server may transmit to device C an indication that the users of device B and D are within a radius of 25 meters from the user of device C; and/or the application server may transmit to device D an indication that the users of device B and C are within a radius of 25 meters from the user of device D.

As shown in FIG. 4, mobile device may transmit another scan list to the proximity server, e.g., at a later time period.

Figure 5:
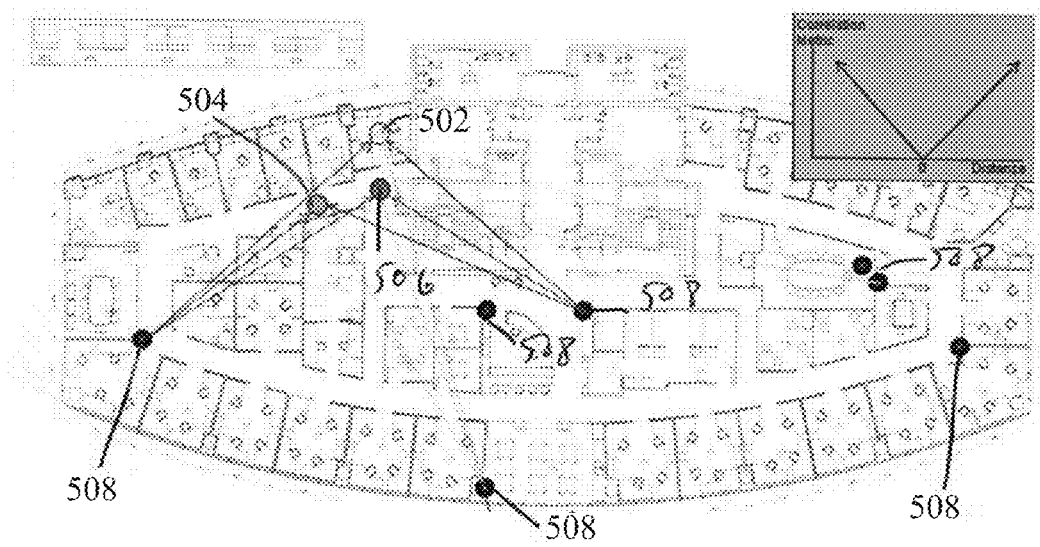
FIG. 5 is a schematic illustration of deployment of a plurality of mobile stations, in accordance with some demonstrative embodiments.

Reference is now made to FIG. 5, which schematically illustrates the deployment of a plurality of mobile stations, in accordance with some demonstrative embodiments.

As shown in FIG. 5, mobile devices 502, 504 and 606 at proximate locations on a building floor. As shown in FIG. 5, each of mobile devices 502, 504 and 506 may detect a similar scanning list of a plurality of APs 508 located on the floor. The closer devices 502, 504 and 506, the greater similarity between the scan lists detected by devices 502, 504 and 506.

Figure 6:
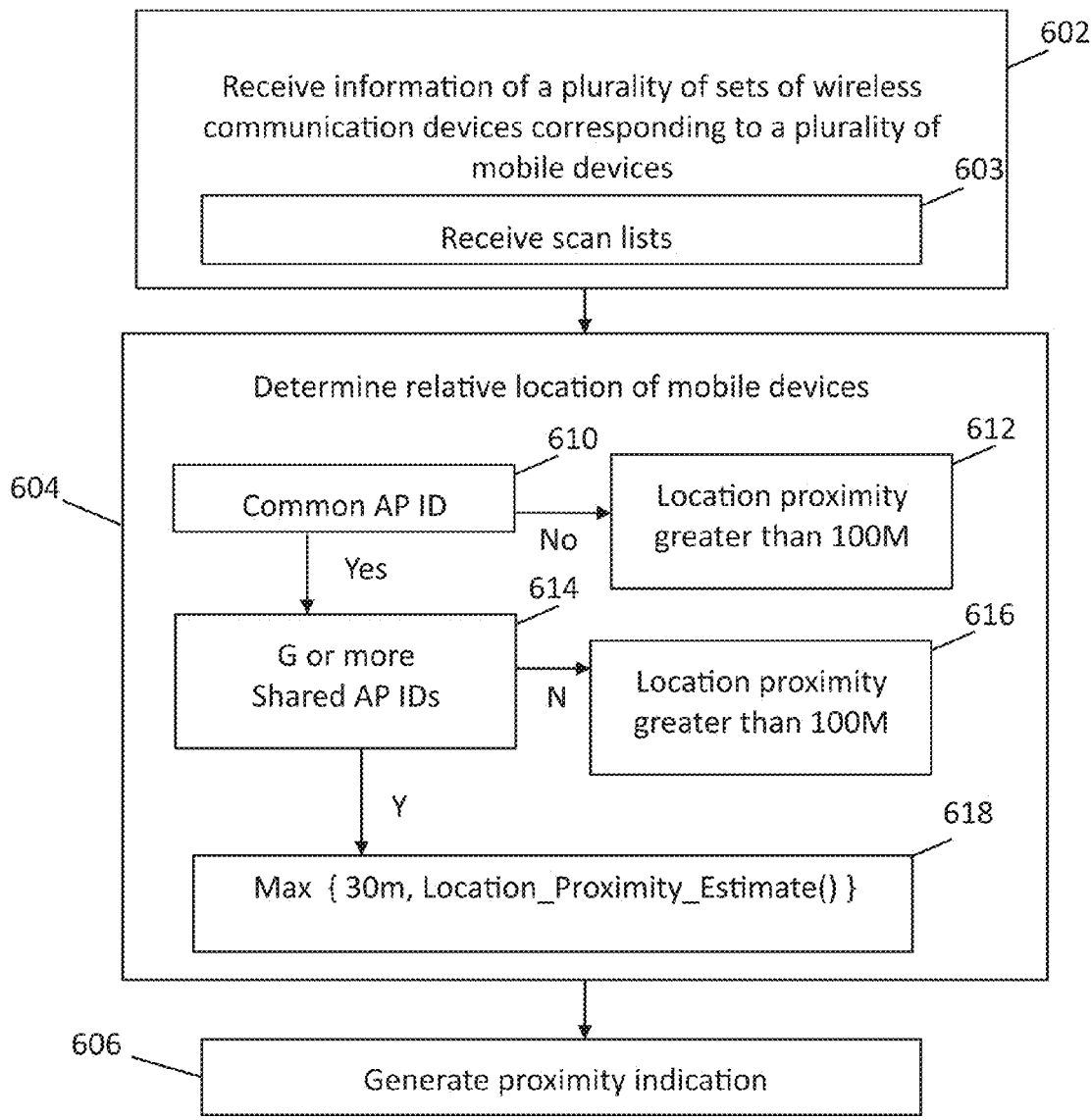
FIG. 6 is a schematic illustration of a method of determining relative locations between mobile devices, in accordance with some demonstrative embodiments.

Reference is made to FIG. 6, which schematically illustrates a method of determining relative locations between mobile devices, in accordance with some demonstrative embodiments. In some demonstrative embodiments, one or more of the operations of the method of FIG. 6 may be performed by a system, e.g., system 100 (FIG. 1), a mobile device, e.g., mobile devices 106, 108 and/or 110 (FIG. 1), a server, e.g., server 102 (FIG. 1), and/or a proximity estimator, e.g., proximity estimator 104 (FIG. 1).

As indicated at block 602, the method may include receiving input information of a plurality of sets of one or more wireless communication devices corresponding to a plurality of mobile devices, respectively.

As indicated at block 603, receiving the input information of the plurality of sets of one or more wireless communication devices may include receiving a plurality of scan lists of APs detected by the plurality of mobile devices. For example, server 102 (FIG. 1) may receive scan lists of APs detected by mobile devices 106, 108 and/or 110 (FIG. 1), e.g., as described above.

As indicated at block 604, the method may include determining relative locations between the plurality of mobile devices based on the information of the plurality of sets of wireless communication devices. For example, proximity estimator 104 (FIG. 1) may determine a relative location between mobile devices 106, 108 and/or 110 based on a relationship between the APs and/or the RSSI detected by mobile devices 106, 108 and/or 110, e.g., as described above.

As indicated at block 610, determining the relative location between the mobile devices may include identifying one or more pairs of mobile devices having at least one common AP. For example, proximity estimator 104 (FIG. 1) may identify one or more pairs of mobile devices 106, 108 and/or 110 (FIG. 1) having at least one common APs, e.g., as described above.

As indicated at block 612, determining the relative location between the mobile devices may include determining that a pair of mobile devices has a location proximity greater than a first predefined distance, e.g., 100 meters (m), for example, if the pair of mobile devices is not identified as having at least one common AP. For example, proximity estimator 104 (FIG. 1) may determine that pair of mobile devices 110 and 108 (FIG. 1) and/or the pair of mobile devices (FIG. 1) 106 and 110 (FIG. 1) has a location proximity greater than 100 m, for example, if mobile devices 106 and 110 (FIG. 1) and/or the pair of mobile devices 108 and 110 (FIG. 1) is not identified as having at least one common AP.

As indicated at block 614, determining the relative location between the mobile devices may include determining whether one or more pairs of the identified pairs of mobile devices has at least a predefined number of common APs. For example, proximity estimator 104 (FIG. 1) may identify one or more pairs of mobile devices 106, 108 and/or 110 (FIG. 1) having at least G common APs, e.g., as described above.

As indicated at block 616, determining the relative location between the mobile devices may include determining that a pair of mobile devices has a location proximity less than the first predefined distance, for example, if the pair of mobile devices is identified as having at least one common AP but not having the predefined number of common APs. For example, proximity estimator 104 (FIG. 1) may determine that pair of mobile devices 106 and 108 (FIG. 1) has a location proximity less than 100 m, for example, if mobile devices 106 and 108 (FIG. 1) have at least one common AP but do not have more than G common APs.

As indicated at block 618, determining the relative location between the mobile devices may include determining a proximity metric corresponding to a pair of mobile devices having more than the predefined number of common APs. For example, proximity estimator may determine the proximity metric Location_Proximity_Estimate corresponding to one or more pairs of mobile devices 106, 108 and 110 (FIG. 1) having more than G common APs, e.g., as described above.

As indicated at block 606, the method may include generating a proximity indication based on the relative location. For example, server 102 (FIG. 1) may determine whether or not to transmit a proximity alert based on the determined relative location of devices 106, 108 and/or 110 (FIG. 1), e.g., as described above.

Figure 7:
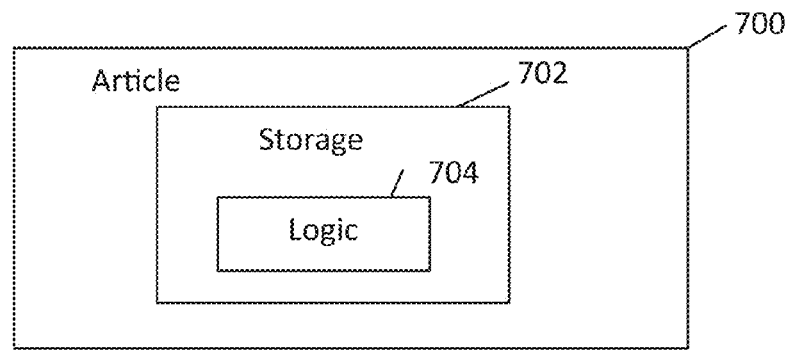
FIG. 7 is a schematic illustration of an article of manufacture, in accordance with some demonstrative embodiments.

Reference is made to FIG. 7, which schematically illustrates an article of manufacture 500, in accordance with some demonstrative embodiments. Article 700 may include a machine-readable storage medium 702 to store logic 704, which may be used, for example, to perform at least part of the functionality of server 102 (FIG. 1), proximity estimator 104 (FIG. 1), and/or to perform one or more operations of the method of FIG. 6.

In some demonstrative embodiments, article 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
a communication component to receive input information including at least a first input corresponding to a first mobile device and a second input corresponding to a second mobile device, the first input including first values, as measured with respect to wireless signals communicated between the first mobile device and a first set of wireless communication devices, the second input including one or more second values, as measured with respect to wireless signals communicated between the second mobile device and a second set of wireless communication devices; and
a proximity estimator component configured to identify one or more common wireless communication devices, which are included in both the first and second sets of wireless communication devices, the proximity estimator component configured to determine one or more zero-crossing parameter values based on one or more of the first values measured with respect to the one or more common wireless communication devices and one or more of the second values measured with respect to the one or more common wireless communication devices, the proximity estimator component configured to determine a proximity between said first mobile device and said second mobile device, based on a zero-crossing criterion, which is based on a change in a sign of the one or more zero-crossing parameter values.

2. The device of claim 1, wherein the first values include values measured by the first mobile device with respect to wireless signals received from the first set of wireless communication devices.

3. The device of claim 1, wherein said first values include values measured by at least one wireless communication device of the first set of wireless communication devices with respect to signals received from the first mobile device.

4. The device of claim 1, wherein said input information includes one or more values, which depend on a relative location of said first and second mobile devices with respect to said first and second sets of wireless communication devices, respectively.

5. The device of claim 1, wherein said first values include one or more Time of Flight (TOF) values.

6. The device of claim 1, wherein said input information includes at least one scan list of at least one of said first and second mobile devices.

7. The device of claim 1, wherein the first values include one or more Received Signal Strength Indicator (RSSI) values.

8. The device of claim 1, wherein one or more wireless communication devices of the first set of wireless communication devices comprise one or more access points.

9. The device of claim 1, wherein said proximity estimator component is capable of generating a proximity indication corresponding to the first and second mobile devices, if the determined proximity satisfies a proximity criterion.

10. The device of claim 1, wherein the input information comprises real-time information.

11. A system comprising:
a server comprising a memory having stored thereon computer-executable instructions, and a processor to execute said instructions to implement one or more operations at the server, the operations comprising:
receiving input information including at least a first input corresponding to a first mobile device and a second input corresponding to a second mobile device, the first input including first values, as measured with respect to wireless signals communicated between the first mobile device and a first set of wireless communication devices, the second input including one or more second values, as measured with respect to wireless signals communicated between the second mobile device and a second set of wireless communication devices;
identifying one or more common wireless communication devices, which are included in both the first and second sets of wireless communication devices;
determining one or more zero-crossing parameter values based on one or more of the first values measured with respect to the one or more common wireless communication devices and one or more of the second values measured with respect to the one or more common wireless communication devices; and
determining a proximity between said first mobile device and said second mobile device, based on a zero-crossing criterion, which is based on a change in a sign of the one or more zero-crossing parameter values.

12. The system of claim 11, wherein the first values include values measured by the first mobile device with respect to wireless signals received from the first set of wireless communication devices.

13. The system of claim 11, wherein said first values include values measured by at least one wireless communication device of the first set of wireless communication devices with respect to signals received from the first mobile device.

14. The system of claim 11, wherein the first values include one or more Time of Flight (TOF) values.

15. The system of claim 11, wherein said server is capable of generating a proximity indication corresponding to the first and second mobile devices, if the determined proximity satisfies a proximity criterion.

16. A method comprising:
   receiving input information including at least a first input corresponding to a first mobile device and a second input corresponding to a second mobile device, the first input including first values, as measured with respect to wireless signals communicated between the first mobile device and a first set of wireless communication devices, the second input including one or more second values, as measured with respect to wireless signals communicated between the second mobile device and a second set of wireless communication devices;
   identifying one or more common wireless communication devices, which are included in both the first and second sets of wireless communication devices;
   determining one or more zero-crossing parameter values based on one or more of the first values measured with respect to the one or more common wireless communication devices and one or more of the second values measured with respect to the one or more common wireless communication devices; and
   determining a proximity between said first mobile device and said second mobile device, based on a zero-crossing criterion, which is based on a change in a sign of the one or more zero-crossing parameter values.

17. The method of claim 16, wherein the first values include values measured by the first mobile device with respect to wireless signals received from the first set of wireless communication devices.

18. The method of claim 16, wherein said first values include values measured by at least one wireless communication device of the first set of wireless communication with respect to signals received from the first mobile device.

19. The method of claim 16, wherein the first values include one or more Received Signal Strength Indicator (RSSI) values.

20. The method of claim 16 comprising generating a proximity indication corresponding to the first and second mobile devices, if the determined proximity satisfies a proximity criterion.

* * * * *